No. 877,361.
PATENTED JAN. 21, 1908.
F. E. NELSON & G. W. TRIBBEY.
GATE.
APPLICATION FILED SEPT. 30, 1907.
2 SHEETS—SHEET 1.
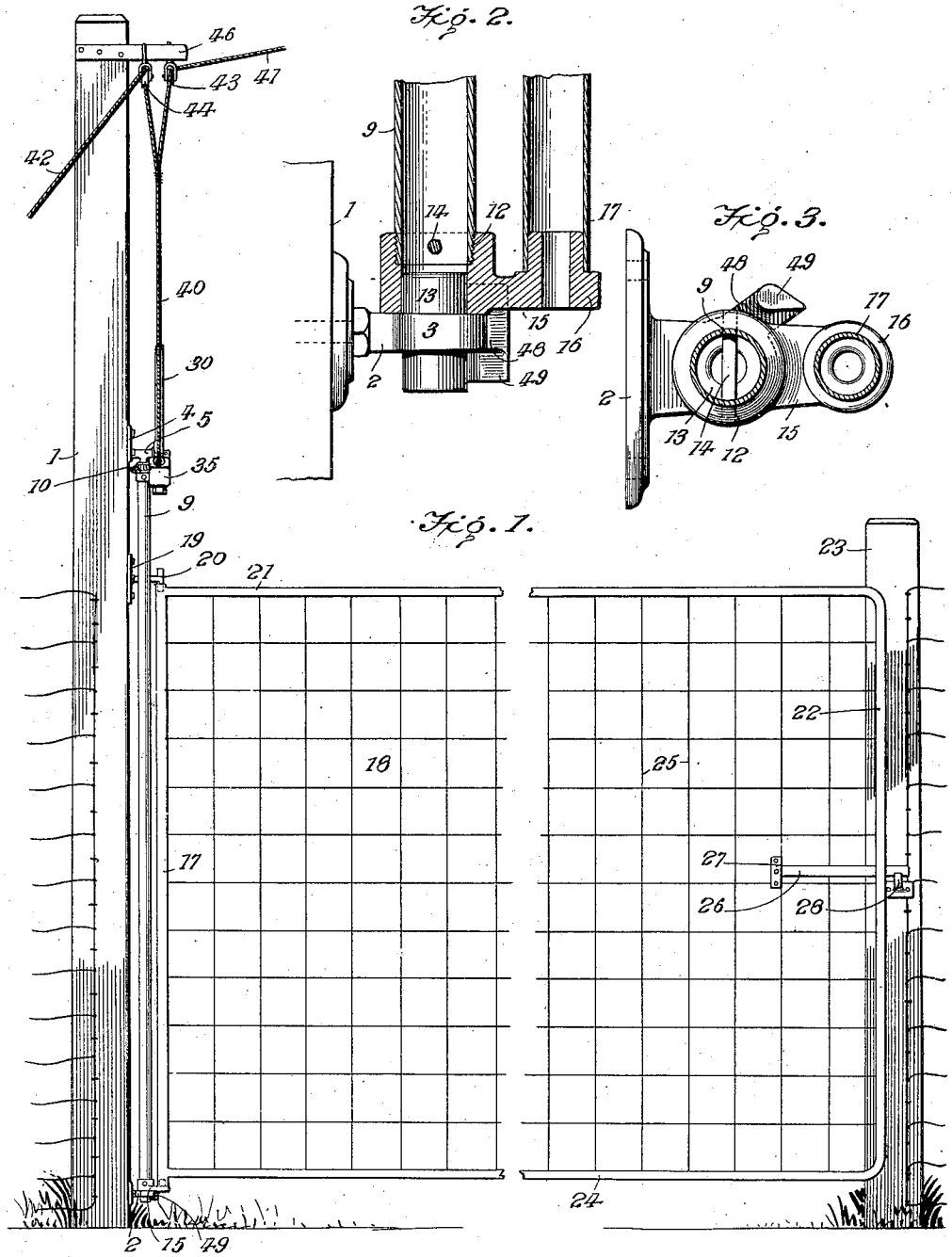
WITNESSES
J. H. Schmidt.
C. E. Trainor
INVENTORS
FREDERICK E. NELSON,
GEORGE W. TRIBBEY,
BY Munn & Co.
ATTORNEYS No. 877,361. PATENTED JAN. 21, 1908.
F. E. NELSON & G. W. TRIBBEY.
GATE.
APPLICATION FILED SEPT. 30, 1907.
2 SHEETS—SHEET 2.
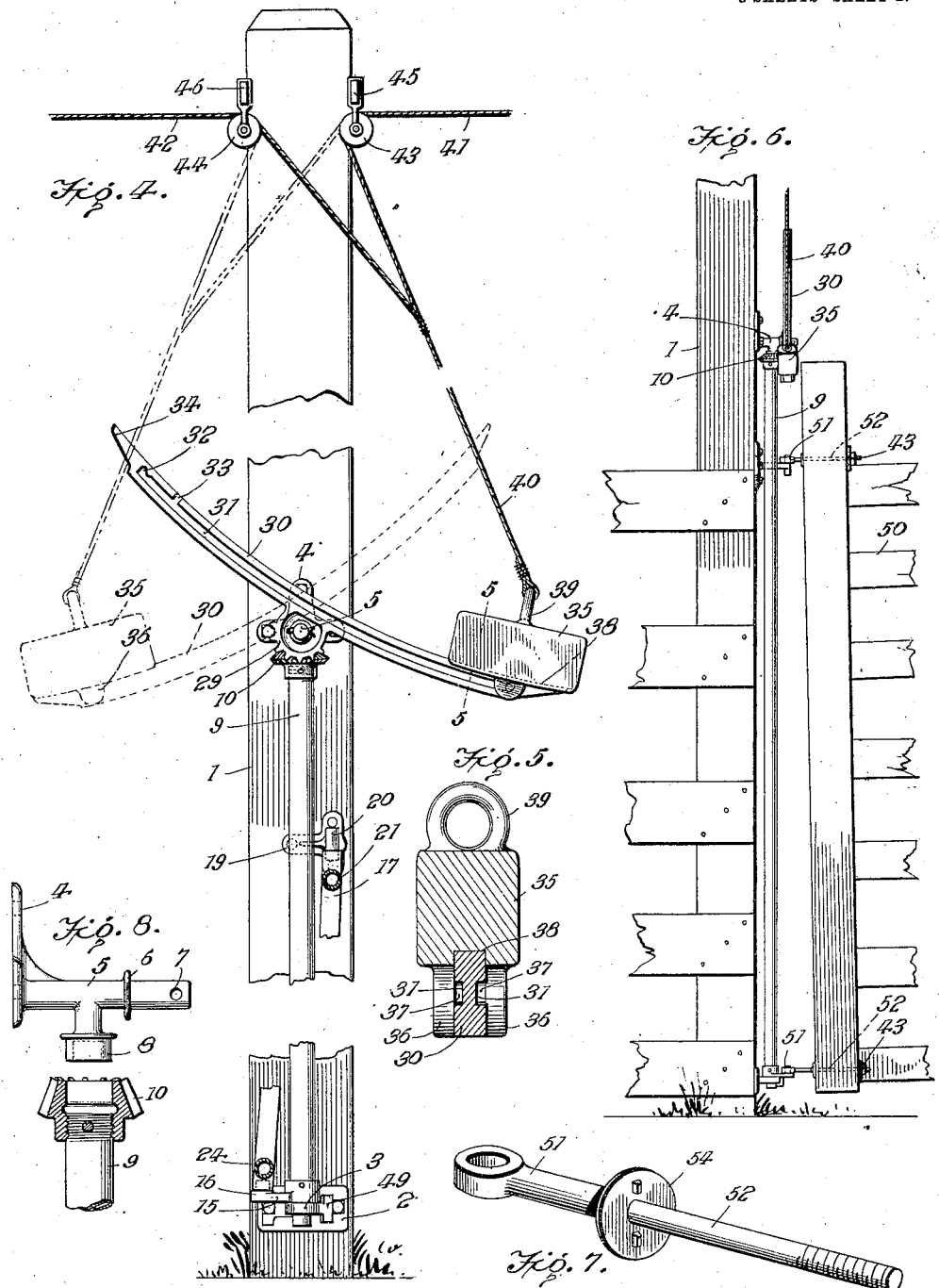
WITNESSES
INVENTORS
FREDERICK E. NELSON.
GEORGE W. TRIBBEY.
BY
ATTORNEYS

UNITED STATES PATENT OFFICE.

FREDERICK E. NELSON AND GEORGE W. TRIBBEY, OF MARSHFIELD, OREGON.

GATE.

No. 877,361.  Specification of Letters Patent.  Patented Jan. 21, 1908.

Application filed September 30, 1907. Serial No. 395,059.

*To all whom it may concern:*

Be it known that we, FREDERICK E. NELSON and GEORGE W. TRIBBEY, citizens of the United States, and residents of Marshfield, in the county of Coos and State of Oregon, have invented an Improvement in Gates, of which the following is a specification.

Our invention is an improvement in gates, and consists in certain novel constructions and combinations of parts hereinafter described and claimed, the present invention being an improvement over our prior patent No. 827,555, dated July 31, 1906.

Referring to the drawings forming a part hereof, Figure 1 is a side view showing an iron gate constructed in accordance with our improvement. Fig. 2 is a detail sectional view of the lower support for the operating rod. Fig. 3 is a top plan view of Fig. 2. Fig. 4 is a front view of the gate post and the operating mechanism for the gate. Fig. 5 is a section on the line 5—5 of Fig. 4. Fig. 6 is a side view of a portion of a wooden gate provided with the operating mechanism. Fig. 7 is a detail perspective view of one of the hinges of the wooden gate; and Fig. 8 is a side view of the bracket supporting the upper end of the operating rod.

In the present embodiment of our invention, we provide a gate post 1 of considerable height and having near its lower end a bracket having a base 2 secured to the gate post, and a ring bearing 3, for a purpose to be presently described. At a distance below the upper end of the gate post, is arranged another bracket having its base 4 secured to the gate post, and provided with a horizontal cylindrical portion 5, provided at its outer end with a transverse opening 7 and at approximately its center with a collar 6. Depending from the horizontal portion is a pin 8 which is received in the upper end of the beveled gear 10, threaded to the outer end of the operating rod or shaft 9, as shown in Fig. 8.

The lower end of the operating rod or shaft 9 is threaded into a socket 12, the lower portion of the socket having a post 13 secured therein, and engaging the ring bearing 3 before described, the rod being secured in place by a pin 14.

The socket 12 is provided with a radial projection or lug 15 having a cylindrical portion 16 around which is seated the rear hollow upright 17 of the gate 18, the bottom of the upright resting on the lug or projection 15. The upper end of the upright is engaged by a post 20, comprising a part of a bracket 19 which is secured to the gate post at approximately the level of the top of the gate.

The gate 18 is composed of the rear upright 17 before described, integral with the top and bottom bars 21, 24, and another integral upright 22, and the gate is adapted when closed to rest against a post 23, provided with a catch 28 for engagement by a latch 26 pivoted to a bracket 27 on the gate, and the frame of the gate is covered by wire netting 25, as shown in Fig. 1.

An arc shaped bar 30 is provided with a segmental bevel gear 29, which is journaled on the cylindrical portion 5 before mentioned, the gear resting against the collar 6 and being retained in position by a pin traversing the opening 7 through the said cylindrical portion. The bar 30 is provided on each side with grooves 31, and at each end of the grooves are notches 32, and at a distance from one of the ends are other grooves 33, leading from the grooves 31 to the edge of the bar. The ends of the bar are extended as at 34, beyond the grooves, for a purpose to be presently described.

A weight 35 is provided on its lower face with ears 36 having lugs 37 for engaging the grooves 31, and the lower face of the weight is grooved, as at 38, to receive the upper edge of the bar. The weight may be placed on the bar and removed therefrom, by passing the lugs 37 along the grooves 31, until the grooves 33 are reached, when the said grooves permit the removal of the weight, this movement being reversed when the weight is placed on the bar.

The upper face of the weight is provided with an eye 39, to which is connected a rope 40, the rope branching as at 41, 42, at a short distance above the weight, and the branches pass over pulleys 43, 44, supported on braces 45, 46, connected with the gate post, to opposite sides of the gate, the outer ends of the ropes being supported in any suitable manner whereby access may be had to them by parties wishing to open or close the gate.

In operation, the gate being in closed position as shown in Fig. 1, a pull on the branch rope 42, will lift the weight and swing the arc shaped bar into the position shown in dotted lines in Fig. 4. This movement of the bar will oscillate the rod 9, and will swing the lug 15 into the position shown in Fig. 3, that is, with the lower end of the rear upright of the gate directly in front of the operating rod 9, which movement tends to push the lower end of the gate away from the gate post, and to elevate the unattached end of the gate, so that the latch is released from the catch. A continuation of the rotation of the shaft 9 now opens the gate. Meanwhile the weight 35 is slipped from the position shown in full lines in Fig. 4 to the position shown in dotted lines in said figure, thus retaining the arc shaped bar in the position shown in dotted lines in said figure. When the operator passes through the gate and makes traction on the branch rope 41, the gate is swung shut, and after the engagement of the free end of the gate with the post 23, the lug 15 continues its swinging movement and brings the rear lower corner of the gate near to the gate post 1, so that the free end of the gate is lowered to engage the latch with the catch. The bracket at the lower end of the gate post, designated as 2, is provided with a projection 48, having integral therewith a stop 49 for engagement by the lug 15, whereby to limit its swinging movement after the closing of the gate.

In Fig. 6 is shown the improvement as applied to a wooden gate, in which construction the rear upright of the wooden gate 50 is provided at its top and bottom with eye bolts 51, having a portion 52 passing through the upright and secured in place by a nut 53, a collar 54 being arranged on the portion 52 for engaging the upright, whereby to properly space it from the brackets 2 and 19, and the eyes of the eye bolts are engaged with the posts of such brackets as clearly shown in Fig. 6. The operation of the wooden gate is precisely the same as with the iron gate, the only difference between the gates being in the mounting.

The stop 49 limits the swinging movement of the lug 15, after the free end of the gate engages the gate post, and the object of the stop is to maintain the gate in a substantially level position. When the gate swings to, the free end thereof is slightly elevated since the lug 15 is in substantial alinement with the bottom of the gate. This elevation permits the unlatching of the gate. When the gate is shut, the lug 15 and the bottom of the gate are in substantial alinement until the free end of the gate engages the post 23. This engagement stops the swinging motion of the free end of the gate, but the lug is permitted to swing slightly farther until it meets the stop 19, and since the lug is now out of alinement with the lower bar 24 of the gate, the free end of the gate drops slightly thus engaging the latch with the catch.

We claim:

1. The combination with the gate post, of a bearing secured thereto near the lower end thereof, a second bearing above the first-named bearing, a rod journaled in the bearings and provided at its upper end with a bevel gear, said upper bearing being provided with a horizontal cylindrical projection, an arc shaped bar having a segmental gear at the center thereof, said segmental gear being journaled on the cylindrical projection, and engaging the bevel gear on the rod, said bar being provided with grooves on each side thereof, having notches at their ends and connected by transverse grooves with the edge of the bar, a weight having a groove for receiving the edge of the bar, and provided with downwardly projecting spaced ears, said ears being provided with lugs for engaging the grooves, means connected with the weight for swinging the bar, a bracket secured to the lower end of the rod and projecting horizontally therefrom, a gate having its lower corner hinged to the end of the bracket, a hinge connecting the upper corner of the gate with the post, and a stop for limiting the swinging movement of said lower hinge with respect to said first - named bracket.

2. The combination with the gate posts, of the rod journaled longitudinally of one of the posts, and provided at its lower end with a radial arm, a gate hinged by one of its lower corners to the arm and by its corresponding upper corner to the post, the free end of the gate resting against the other post when the gate is closed, means in connection with the rod for partially rotating the same to open and close the gate, said means comprising an arc shaped bar having at its center a segmental gear upon whose center the bar oscillates, a connection between the bar and the rod, whereby the rocking of the bar will partially rotate the rod, said bar being provided with grooves on each side thereof having notches at their ends, and connected by transverse grooves with the edge of the bar, a weight having a groove for receiving the edge of the bar and provided with downwardly projecting spaced ears, said ears being provided with lugs for engaging the grooves, means connected with the weight for swinging the bar, and a stop for engaging the arm after the gate is closed, said stop being arranged to permit the arm to swing beyond the line between the posts for the purpose set forth.

3. The combination with the gate posts, of the rod journaled longitudinally of one of the posts, and provided at its lower end with a radial arm, a gate hinged by one of its lower corners to the arm and by its corresponding upper corner to the post, the free end of the gate resting against the other post when the gate is closed, means in connection with the rod for partially rotating the same to open and close the gate, said means comprising an arc shaped bar having at its center a segmental gear upon whose center the bar oscillates, a connection between the bar and the rod, whereby the rocking of the bar will partially rotate the rod, said bar being provided with grooves on each side thereof, a weight provided with downwardly projecting spaced ears, said ears being provided with lugs for engaging the grooves, means connected with the weight for swinging the bar, and a stop for engaging the arm after the gate is closed, said stop being arranged to permit the arm to swing beyond the line between the posts, for the purpose set forth.

4. The combination with the gate posts, of the rod journaled longitudinally of one of the posts, and provided at its lower end with a radial arm, a gate hinged by one of its lower corners to the arm and by its corresponding upper corner to the post, the free end of the gate resting against the other post when the gate is closed, means in connection with the rod for partially rotating the same to open and close the gate, said means comprising an arc shaped bar having at its center a segmental gear upon whose center the bar oscillates, a connection between the bar and the rod, whereby the rocking of the bar will partially rotate the rod, said bar being provided with grooves on each side thereof, a weight provided with downwardly projecting spaced ears, said ears being provided with lugs for engaging the grooves, means in connection with the grooves for permitting the removal of the weight, means connected with the weight for swinging the bar.

5. The combination with the gate posts, of a rod journaled longitudinally of one of the posts and provided at its lower end with a radial arm, a gate hinged by one of its lower corners to the arm, and by its corresponding upper corner to the post, the free end of the gate resting against the other post when the gate is closed, means in connection with the rod for partially rotating the same to open and close the gate, and a stop for engaging the arm after the gate is closed, said stop being arranged to permit the arm to swing beyond the line between the posts, for the purpose set forth.

FREDERICK E. NELSON.
GEORGE W. TRIBBEY.

Witnesses:
ALEXANDER STAUFF,
MAY R. STAUFF.